Jan. 6, 1925. 1,522,160
I. D. WALTER
RIM FOR WHEELS
Filed Sept. 27, 1922 2 Sheets-Sheet 1
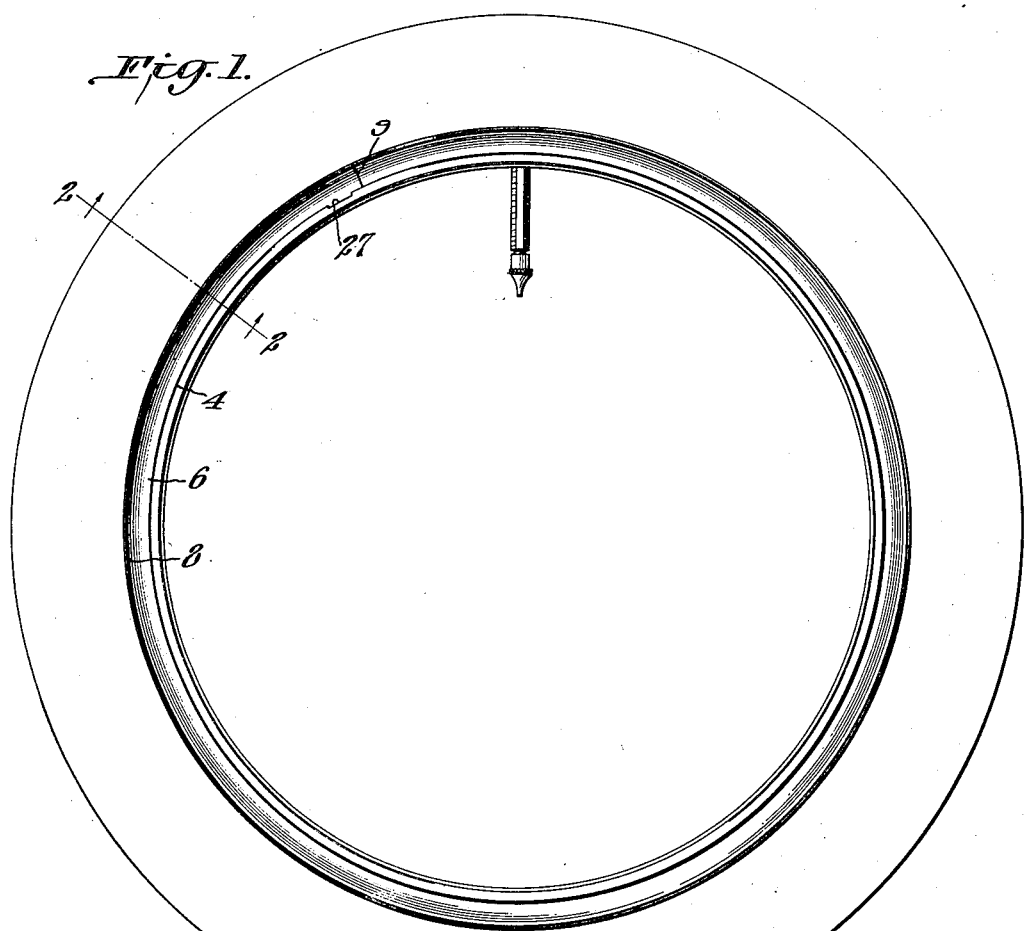
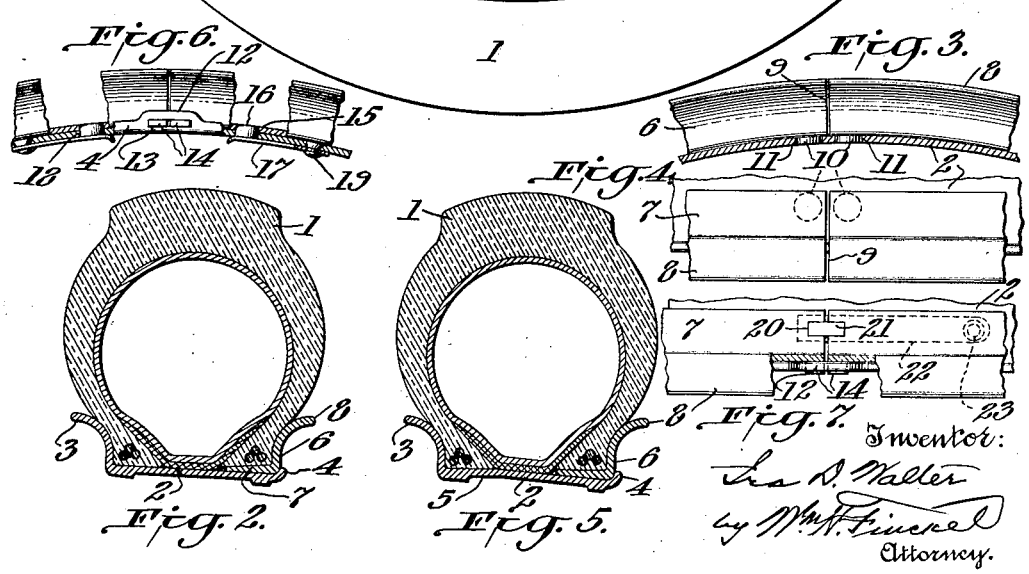

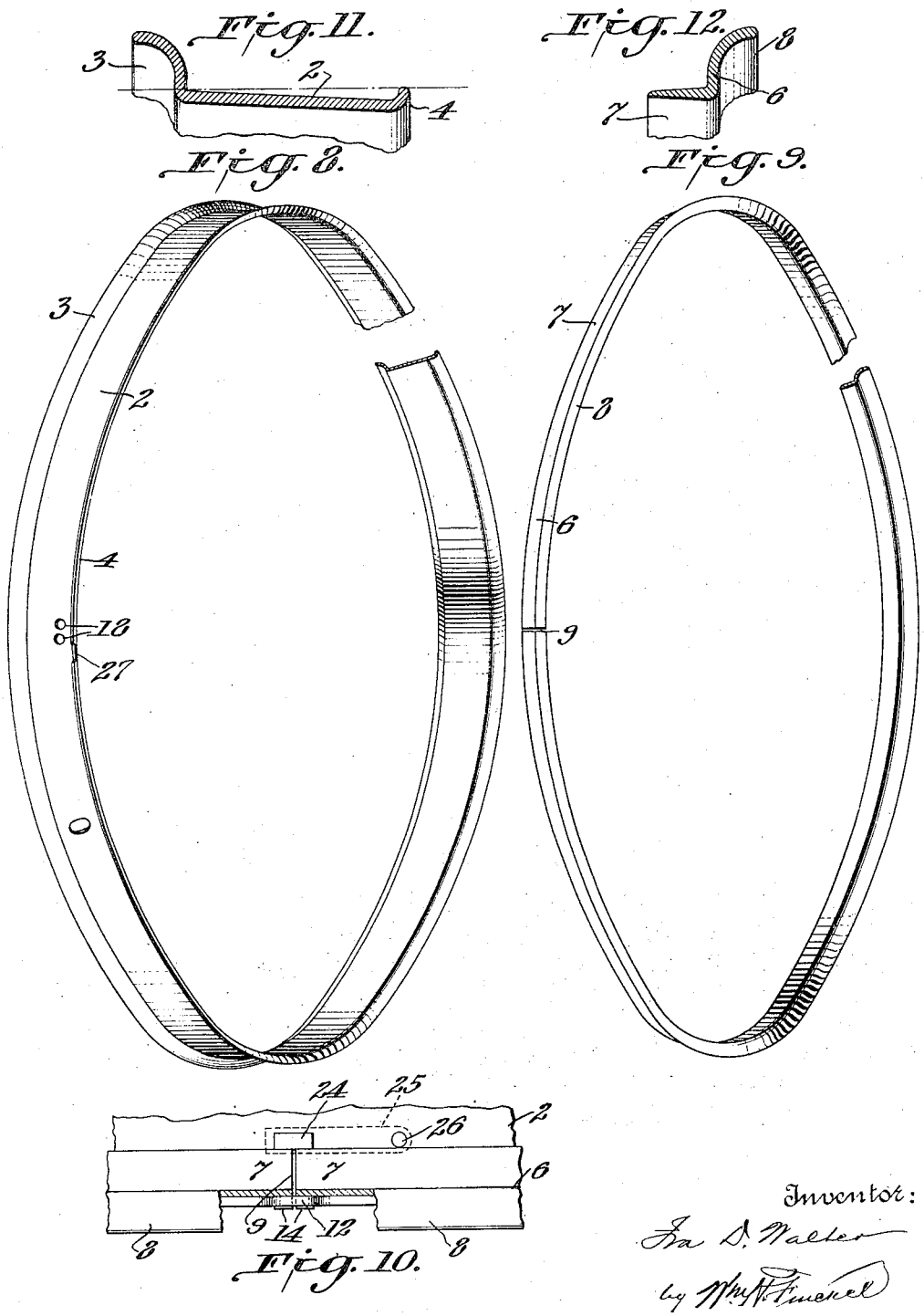

Patented Jan. 6, 1925.

1,522,160

UNITED STATES PATENT OFFICE.

IRA D. WALTER, OF HARRISBURG, ARKANSAS, ASSIGNOR OF ONE-FOURTH TO JOSIAH BRINKERHOFF AND ONE-FOURTH TO CHARLES R. FRENCH, BOTH OF HARRISBURG, ARKANSAS.

RIM FOR WHEELS.

Application filed September 27, 1922. Serial No. 590,923.

*To all whom it may concern:*

Be it known that I, IRA D. WALTER, a citizen of the United States, residing at Harrisburg, in the county of Poinsett and State of Arkansas, have invented a certain new and useful Improvement in Rims for Wheels, of which the following is a full, clear, and exact description.

The object of this invention is to provide a rim that will render the operation of changing tires quicker and easier than in the case of any of the prior types of rims to me known. The invention embodies a construction that is simple in mechanical detail and from which are eliminated various forms of curved and other projections, and channels along the outer edge of the rim, thereby reducing the cost of production and also avoiding difficulties in removing and replacing the tire. The invention also provides a rim of a smooth outer contour and so enhances the appearance of the wheel very materially.

The invention relates to that class of rims in which there is a detachable side ring used to secure the tire on the rim. In all of the constructions of this type of rims to me known, it is a matter of great difficulty and requiring considerable amount of labor, to remove the tightly fitting tire casing from the rim proper even after the side ring is detached, for the reason that the rim has a base from which a substantially non-stretchable tire must be removed by a sidewise or pivotal movement of the tire, in which movement one portion of the tire remains stationary because of the engagement of the valve stem with the rim. Where a split or transversely divided rim is used in an attempt to avoid or lessen some of these difficulties, the object is but imperfectly accomplished and new difficulties are encountered in that the force exerted to open the split rim results in more or less deformation of the rim with its well known consequences exhibited in excessive wear on the tread of the tire by reason of its losing its essentially circular form. This deformation of the rim also renders difficult the mounting and demounting of the rim in connection with the wheel.

The present invention seeks to overcome the difficulties enumerated and others, and to provide a rim that may be easily operated, by even unskilled autoists who are frequently forced to make tire changes on the road or where the facilities of a service station are not at hand. It also provides a construction in which simplicity of detail and the maximum of reliability and safety are combined in a rim in which the tire itself grips and locks the detachable ring flange against accidental displacement.

The principle of the invention is embodied in a rim having on one side the usual fixed flange, from which the transverse portion or base slants towards the center of the circle, so that the base of the rim tapers circumferentially from one edge to the other, and so that the rim is of greater diameter at the inner side, namely, that side having the fixed flange than at the other side, this other or outer side being provided with an upstanding shoulder of an outside diameter substantially equal to or preferably slightly in excess of the outside diameter of the body of the rim adjacent to its fixed flange, and a transversely divided or split side ring flange so shaped and proportioned as to be expanded and forced on over the small upstanding shoulder and into a firm seat on the outer surface of the base of the rim and in retaining engagement with said shoulder, the inwardly extending portion of said side ring flange filling the open space between the tire and base of the rim occasioned by the slanting of the rim base, and providing a firm and unyielding base or support for the inner or bearing surface of the tire along its adjacent wall, the construction being such that when the tire is mounted upon the rim and the side ring flange is snapped in place over the shoulder, the tire has a substantially level contact or supporting surface in the combined rim and side ring flange, the side ring flange being then automatically locked in place by the rebound of the tire, as I will proceed now to explain and finally claim.

In the accompanying drawings illustrating the invention, in the several figures of which like parts are similarly designated, Figure 1 is an outside elevation showing my rim in connection with a pneumatic tire. Fig. 2 is a cross-section, on a larger scale, taken on the line 2—2 of Fig. 1. Fig. 3 is a longitudinal section of portions of the rim and side ring flange at the split in the said side ring flange and showing the side ring flange in elevation. Fig. 4 is a fragmentary plan view of Fig. 3. Fig. 5 is a cross-section similar to Fig. 2, showing a modification of the rim. Fig. 6 is a longitudinal section similar to Fig. 3, showing a modification of the connecting means for the side ring flange and rim. Fig. 7 is a fragmentary plan view, partly broken away, illustrating a modification of the connecting means for the side ring flange and rim. Fig. 8 is a perspective view of the rim broken out. Fig. 9 is a perspective view of the side ring flange, broken out. Fig. 10 is a fragmentary plan view, partly broken away, showing another modification of the connecting means for the ring flange and rim. Fig. 11 is a cross-section of the rim alone on a larger scale, and Fig. 12 is a similar view of the side ring flange alone.

1 may represent a pneumatic tire of any approved construction, but, as already stated, the invention is not limited to any particular kind of tire, although I will describe it in connection with the type of tire shown especially in the cross-sections Figs. 2 and 5.

2 is the rim, having the side ring flange 3, as usual. Instead, however, of making the body of the rim a true cylinder I construct this body so that it is substantially frusto-conical or at an incline extending outwardly and toward the hub of the wheel for which the rim is designed, and provide the outer edge of this body with an upturned shoulder 4 of an outside diameter substantially equal to or preferably a little in excess of the outside diameter of the body of the rim adjacent to the flange 3 of said body.

Instead of having the whole of the body slanting from the base of the flange 3, as shown in Fig. 2, the inner side of the rim next to the flange may be cylindrical, as shown at 5, and of a width approximately equal to or a little less than the width of the foot of the tire, and from that point the body slants or tapers outwardly as before.

By reason of this construction, the application of the rim to a tire involves pressure only on that side of the tire that will come next to the flange 3, since the remainder of the body of the rim being of less diameter than the internal diameter of the tire, it will slip by the opposite side of the tire without difficulty; and so also in the demounting of the tire, the liberation of the tire from direct contact of the rim, is required only on this first-mentioned side next to the flange 3.

In order to fill the gap between the rim and the tire at the rim's smaller diameter, I use a side ring flange 6, which is in effect a contractile spring. This device 6 has a substantially cylindrical transverse portion 7 preferably of wedge form in cross-section adapted to extend inwardly between the rim and casing of the tire, and provided with the upstanding flange 8 corresponding substantially with the flange 3 of the rim. The ring flange, therefore, is of right-angled cross-section, and as such gives great transverse strength and guarantees against lateral spreading under the stress or pressure of an inflated tire; and it also prevents circumferential expansion and detachment from the rim. This side ring flange is transversely divided or split at 9, and is provided with or adapted to receive suitable means for engaging the base or body 2 of the rim to prevent circumferential or longitudinal movement as well as accidental movement transversely of the rim. One such means is shown in Figs. 3 and 4, wherein the side ring flange is provided with buttons or lugs 10 which enter holes 11 in the rim when the ring flange is put into position on the rim. After the tire is placed upon the rim it is secured thereon by means of this side ring flange, and the side ring flange is assembled by pressing its portion 7 in between the rim and the tire and until the bottom of its flange 8 snaps over and beyond the shoulder 4 of the rim. As seen in Figs. 2 and 5, this positioning of the side ring flange will serve to grip that side of the tire into a level with the other side of the tire. In the operation of snapping the ring flange in place the buttons or lugs 10 will snap into the holes 11 and thus aid in securing the side ring flange in place against accidental displacement.

In order to detach the side ring flange for access to the tire, any suitable pointed instrument or implement, such as a screw-driver, may be inserted between shoulder 4 and the portion 7 of the side ring flange, and pressure placed upon the instrument or implement to lift one end of the side ring flange and disengage its button or lug from the hole in the rim, and then by very little effort the whole ring flange may be pulled out from beneath the tire and from its engagement with the rim shoulder 4. The replacing of the side ring flange is as easily accomplished. But it will be understood that preliminary to the operation of removing the tire from the rim, it is necessary to push the adjacent portion of the tire inwardly and thereby release its grip upon the portion 7 of the ring flange. In the operation of applying the tire to the rim, similar movement of the tire wall is effected by the portion 7 as the ring flange is inserted.

Explaining more in detail the functioning of the invention, especially in relation to the removal of a tire from the wheel, it is to be said that when the tire is inflated, the inner edges of the tire casing are forced into contact with the sloping base of the rim and its side flange and when the tire is deflated, preparatory to its removal, these inner edges of the tire relax into normal position, and thus the tight grip of the tire casing on the rim is loosened. As soon as the side ring flange is removed after forcing the outer edge or wall of the casing inwardly by means of a tire tool or otherwise, the casing may be easily disengaged from the rim by a proper sidewise movement.

In removing a casing from a demountable rim, the rim and its attached casing are removed from the wheel, and laid down flat with the detachable side ring flange uppermost. As the tire has been already deflated, the wall of the casing may be readily pressed inward by means of an ordinary tire tool or by pressure of the foot adjacent to the abutting ends of the ring flange, and then the side ring flange is disconnected from the rim by forcing its free ends out of engagement with the rim. Ordinarily at this point the rim can be detached from the casing with just the aid of the hands, but if necessary, the rim and the tire may be turned over with the other side up, and the upper wall of the casing may be pressed inward as before until it is out of contact, or out of gripping contact, with the fixed flange of the rim, so as to loosen the casing on the rim base, this loosening being greatly aided by the sloping of the rim base. When the tire is once loosened upon the rim the latter may be lifted and removed from the casing without appreciable effort.

To place the tire upon the rim, the tire may be stood on its tread and the rim may be placed inside until its fixed flange meets the adjacent wall of the casing and then the thus assembled parts may be laid down flat with the smaller diameter of the rim uppermost and the side ring flange snapped in place as already described.

It may be necessary or desirable to provide other means for adding to the security of the engagement of the side ring flange with the rim, and without attempting to illustrate or describe all of the various means that may be employed to this end, I have shown in Figs. 6 and 7 a rim having its shoulder 4 elevated at 12 and provided with a longitudinal slot 13 adapted to be engaged by horizontal lugs 14 on the rim.

Instead of using the fixed buttons or lugs 10 on the ring flange, engaging holes in the rim, I may provide holes 15, Fig. 6, in the portion 7 of the side ring flange, which are engaged by buttons or lugs 16 mounted on springs 17 fastened to the rim and passing through openings 18 in the rim. To disengage this connection it will be necessary to displace the button 16 from the holes 15 and 18 and to move it out of alinement with such holes, and for this purpose spring 17 may be swiveled at 19 to the rim. As shown, such a fastening is preferably used for each end of the split or divided side ring flange.

Another fastening is shown in Fig. 7, wherein the meeting ends of the side ring flange are provided with notches 20 adapted to be engaged by a button or lug 21 on the end of a spring 22 which is swiveled or otherwise fastened at 23 to the rim.

Still another variation is shown in Fig. 10, wherein the button or lug 24 is mounted upon a spring 25 swiveled or otherwise fastened to the rim as at 26, the button or lug being located at the inner edge of the portion 7 of the side ring flange adjacent to its meeting ends.

In all of these cases it is obvious that the button or lug will prevent the undue inward movement of the side ring flange, which is necessary in order to disengage the lugs 14 from the slot 13, preceding which the ring flange cannot be removed from the rim.

To facilitate the insertion of a detaching tool beneath the side ring flange, said ring flange may be provided with the notch 27, Fig. 1, in its shoulder 4.

It is to be understood that the snapping of the ring flange into engagement with the rim and the pressure placed thereon by the tire when in position, effect an assembly of these parts that is operative in itself, and independent of other locking means, but these fastening means are useful to guard against the results of deflation of the tire and to prevent creeping or circumferential movement of the ring flange.

As already sufficiently indicated, the rim and the side ring flange are applicable in principle to a great variety of tires. The particular illustrations selected for the purposes of this specification show in substance a well known commercial form of tire having non-stretchable, straight-sided wire-reenforced bases, to which the rim and the side ring flange are applied.

It will be understood from the foregoing that the rim and side ring flange of this invention present very simple manufacturing problems, and that they may be produced very economically. These advantages are in addition to the advantage of the great facility with which the tire may be removed from the rim and replaced or renewed.

The invention is adaptable to any form of demountable fastening, and with wire or disk wheels, and it may be used also on wheels without demountable connections.

The construction explained herein provides a solid base rim, of true circular contour, the advantages of which are recognized by practical users as well as scientific tire engineers, as contributing materially to the life of the tire. Moreover, the construction affords a self-contained unit and tire mount applicable to a wheel as such.

Any suitable expedient may be adopted to adjust the slanting bottom of the rim to the felly or other construction of the wheel.

Variations in the details of construction and arrangement are permissible within the principle of the invention and the scope of the claims following.

What I claim is:—

1. In a two-part rim for tires, a body portion of greater diameter on one side than on the other and having a fixed tire retaining flange on its side of greater diameter and a fixed outwardly projecting shoulder on its other side, a side flange ring adapted to be snapped over said shoulder and into lateral holding engagement therewith and with the body portion of the rim, and interengaging means on said ring and rim for positioning said ring with respect to the rim, the rim and the side flange ring and their interengaging parts constituting a self-contained unit ready to receive and hold a tire, the rebound of the tire after said ring is snapped in place serving to hold the parts together.

2. In a two-part rim for tires, a body portion of greater diameter on one side than on the other and having a fixed tire retaining flange on its side of greater diameter and an outwardly projecting shoulder on its other side, a side flange ring adapted to be sprung over said shoulder and into lateral holding engagement therewith and with the body portion of the rim, and interengaging means on said ring and rim comprising a lug and cooperating opening for positioning said ring with respect to the rim, the rim and the side flange ring and their interengaging parts constituting a self-contained unit ready to receive and hold a tire, the rebound of the tire after said ring is snapped in place serving to hold the parts together.

3. In a two-part rim for tires, a body portion of greater diameter on one side than on the other and having a rigid tire retaining flange on its side of greater diameter and an outwardly projecting shoulder on its other side, a removable tire retaining side flange ring for the shouldered side of the rim, said side flange ring being adapted to be sprung over said shoulder and to rest against said shoulder and upon the body portion of the rim, a lug carried by said ring and said rim having an opening, said lug and opening providing cooperating means for positioning said ring with respect to the rim, the whole forming a self-contained rim ready to receive and hold a tire by the rebound of the tire.

4. A rim for tires, having a body portion slanting from one side toward the other, a side flange on one edge and an upstanding shoulder on the opposite edge, said upstanding shoulder approximating in outside diameter the outside diameter of the rim body adjacent the side flange, and a contractile ring flange of substantially right-angled cross-section one portion of which is adapted to be slipped between the rim and a tire placed on the rim and snapped over and engaging with the upstanding shoulder on the rim, and interengaging means on the rim and rim flange.

5. A detachable rim for tires, having a body portion slanting from one side toward the other, a side flange on one edge and an upstanding shoulder on the opposite edge, said upstanding shoulder approximating in height the difference in height between the two sides of the rim, and a contractile side ring flange of substantially right-angled cross-section, one portion of which is adapted to be slipped between the rim and a tire placed on the rim and snapped over and engaged by the upstanding shoulder on the rim, the rim having holes adjacent to the meeting ends of the ring flange and the ring flange having complemental buttons or lugs to engage said holes when the ring flange is snapped in place, said parts constituting a self-contained unit ready to receive and hold a tire.

In testimony whereof I have hereunto set my hand this 26th day of September A. D. 1922.

IRA D. WALTER.

Witnesses:
  LILLIE M. KEELER,
  ELLA C. SCHUERMANN.